(12) United States Patent  
Tortorella, Jr.

(10) Patent No.: US 12,033,543 B2
(45) Date of Patent: Jul. 9, 2024

(54) LICENSE PLATE HOLDER

(71) Applicant: Frank Joseph Tortorella, Jr., Park Ridge, IL (US)

(72) Inventor: Frank Joseph Tortorella, Jr., Park Ridge, IL (US)

(*) Notice: Subject to any disclaimer, the term of this patent is extended or adjusted under 35 U.S.C. 154(b) by 0 days.

(21) Appl. No.: 18/357,135

(22) Filed: Jul. 23, 2023

(65) Prior Publication Data  
US 2023/0368705 A1 Nov. 16, 2023

Related U.S. Application Data

(63) Continuation of application No. 17/607,370, filed as application No. PCT/US2019/029789 on Apr. 30, 2019, now Pat. No. 11,710,426.

(51) Int. Cl.  
*G09F 7/18* (2006.01)  
*G09F 9/30* (2006.01)  
*G09F 13/18* (2006.01)  
*B60R 13/10* (2006.01)

(52) U.S. Cl.  
CPC ............... *G09F 7/18* (2013.01); *G09F 9/30* (2013.01); *G09F 13/18* (2013.01); *B60R 13/105* (2013.01); *G09F 2007/1895* (2013.01)

(58) Field of Classification Search  
CPC ... G09F 7/18; G09F 9/30; G09F 13/18; G09F 2007/1895; G09F 21/04; B60R 13/105  
See application file for complete search history.

(56) References Cited

U.S. PATENT DOCUMENTS 3,707,053 A * 12/1972 Itano .......................... G09F 1/12  
40/781  
7,877,908 B2 * 2/2011 Collins ................ B60R 13/105  
40/643

* cited by examiner

*Primary Examiner* — Cassandra Davis

(57) ABSTRACT

A license plate holder includes a base having a connector for attaching the base to a vehicle, a transmissive substrate and a frame. The frame defines a central opening to permit display of indicia on a license plate display region of a license plate disposed between the base and the frame and further defining a frame display region adjacent the central opening, the frame including a rear connector comprising a snap-fit connector to matingly engage an adjacent portion of the base to secure the frame to the base. The transmissive substrate and/or the frame include a connector to removably attach the transmissive substrate to the frame with the transmissive substrate disposed at a front of the frame over the frame display region. A central region of the transmissive substrate is positioned over the license plate display region of the frame and a peripheral region of the transmissive substrate is positioned over the frame display region of the frame to cover the frame display region.

20 Claims, 8 Drawing Sheets

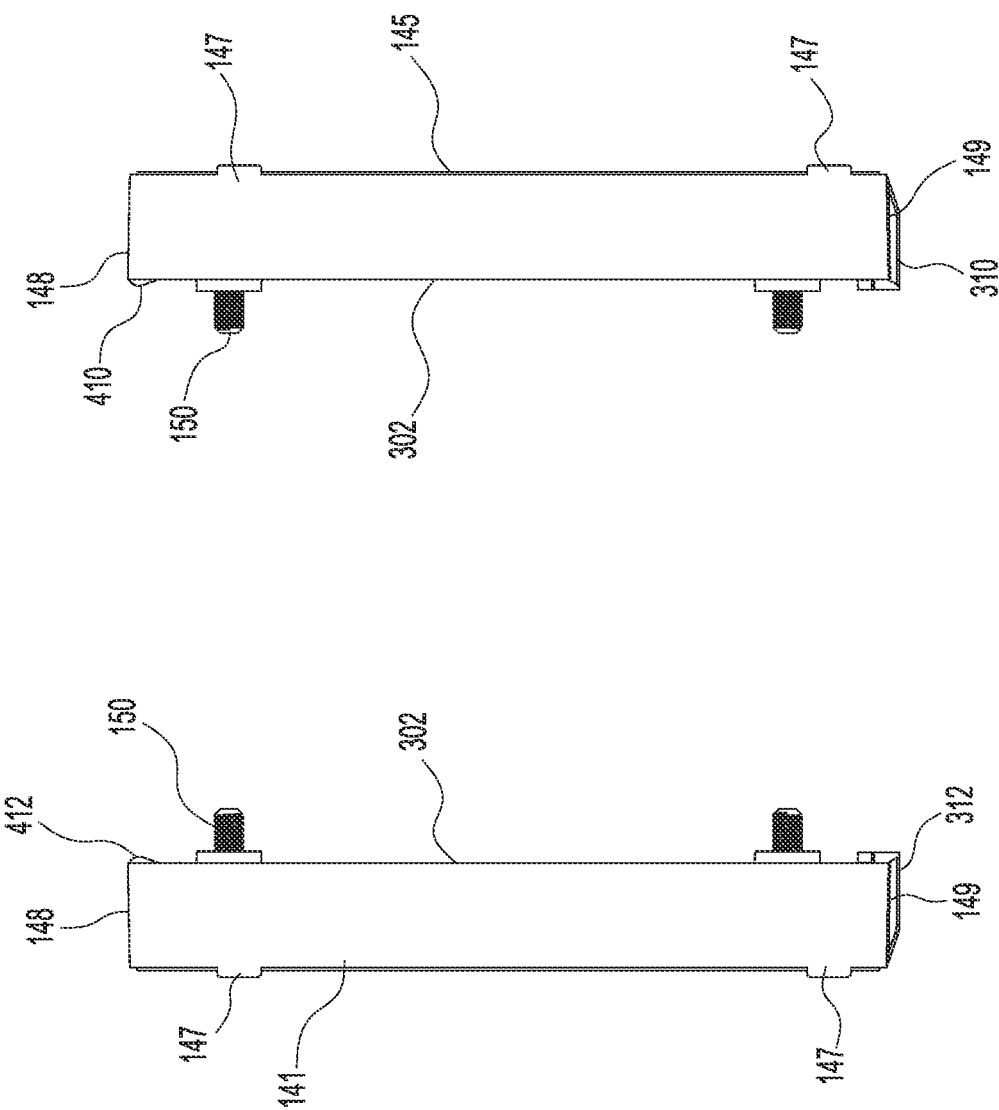

LICENSE PLATE HOLDER

BACKGROUND

A vehicle registration plate, also known as a number plate (British) or a license plate (American), is a metal or plastic plate attached to a motor vehicle or trailer for official identification purposes. All countries require registration plates for road vehicles such as cars, trucks, and motorcycles. The registration identifier is a numeric or alphanumeric ID that uniquely identifies the vehicle owner within the issuing region's vehicle register. In various examples, license plates may be 305 mm×152 mm (12.0"×6.0")(the United States), 520 mm×110 mm (20.5"×4.3") (various European countries), or 440 mm×140 mm (17.3"×5.5") (China). License plates may be formed from a variety of materials, such as plastic or metal (e.g., aluminum, steel, an alloy, etc.).

To secure the license plate to the vehicle, a license plate holder or license plate frame is used to hold the license plate and is itself attached to the vehicle, typically by screws that mount into threaded fittings on the vehicle. The license plate holder is configured to ensure that the license plate numbers and regulatory stickers are not obscured. License plate holders are often made from a metal (e.g., stainless steel, aluminum, etc.) or plastic, and may have a protective coating applied thereover.

BRIEF DESCRIPTION OF THE DRAWINGS

FIGS. 7A-7B are, respectively, example right side and left side views of the example license plate holder of FIGS. 1-6.

Figure 1:
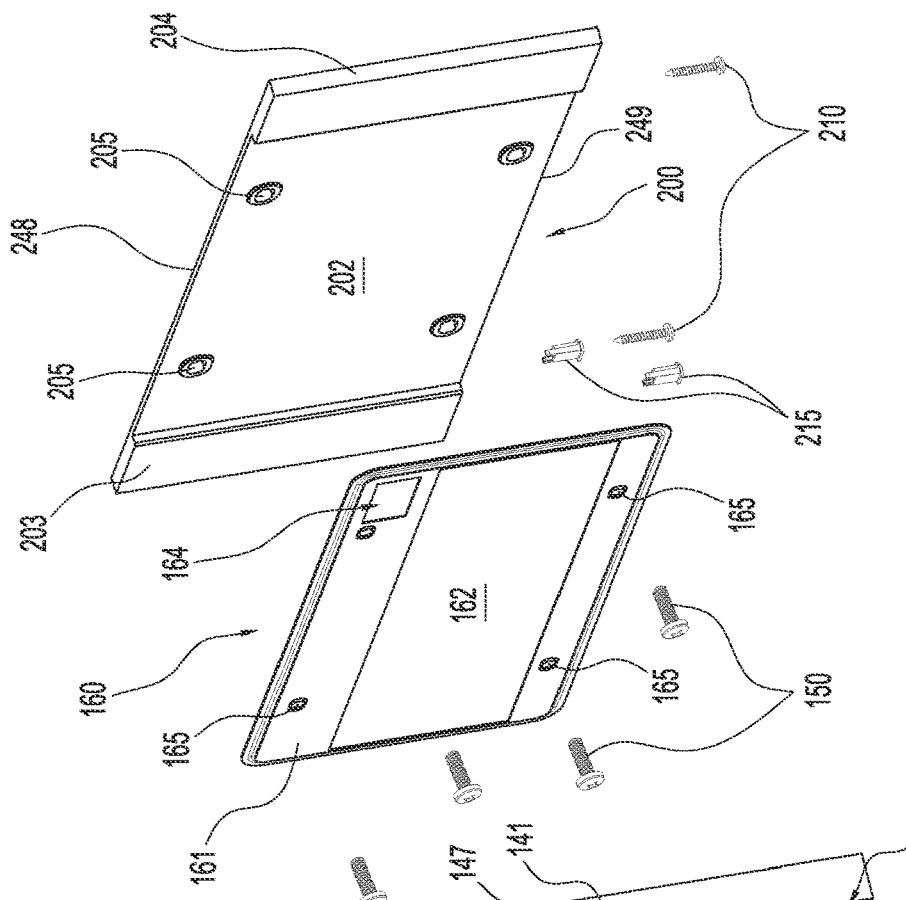
FIG. 1 is an exploded perspective view of an example license plate holder in accord with at least some of the present concepts.
Figure 1:
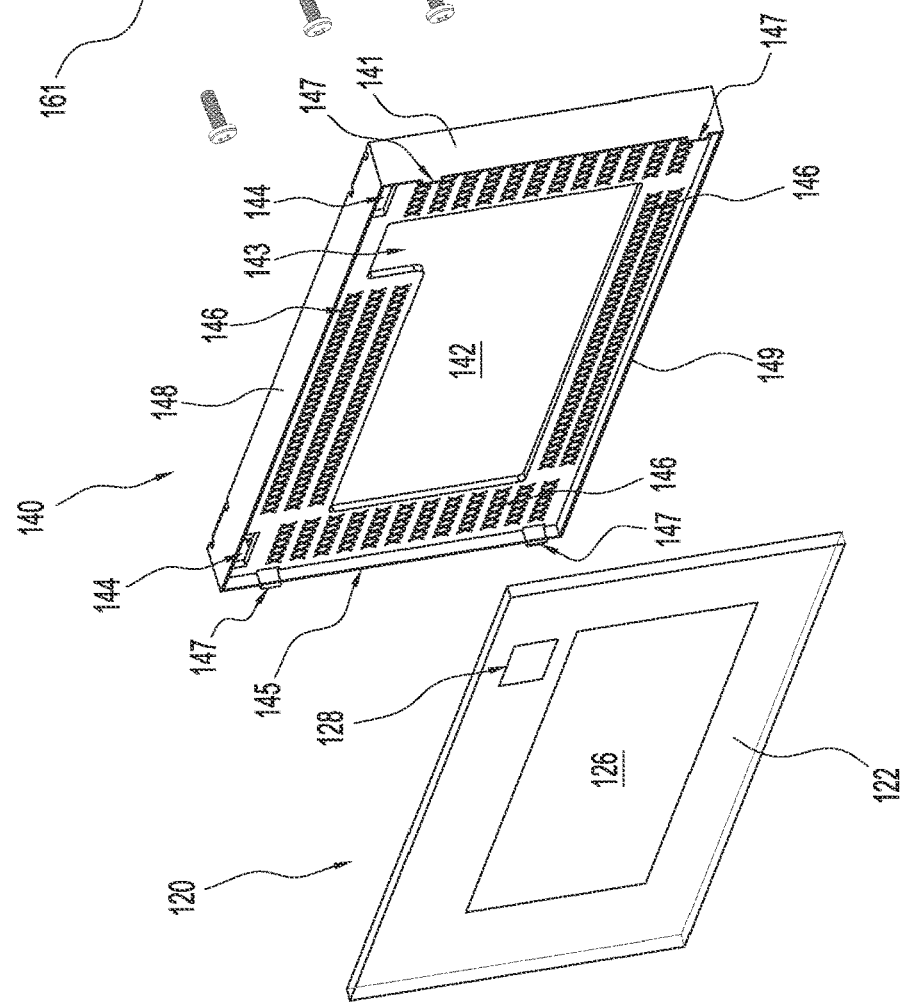

The figures are not necessarily to scale. Wherever possible, the same reference numbers will be used throughout the drawing(s) and accompanying written description to refer to the same or like parts. As used herein, stating that any part is in any way positioned on (e.g., positioned on, located on, disposed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

In some aspects, this disclosure relates to an example license plate holder for vehicles, inclusive of road vehicles (e.g., cars, trucks, motorcycles, scooters, etc.), off-road vehicles (e.g., 3-wheelers, all-terrain vehicles, four wheelers, etc.), and marine vehicles (e.g., boats), which require registration with a governmental body and display of a license plate on the vehicle.

FIG. 1 is an exploded perspective view of an example license plate holder 100 in accord with at least some of the present concepts. The example license plate holder 100 is shown to include, from left-to-right, an example transmissive substrate 120, an example frame 140 and an example base 200. An optional example license plate 160 is also shown in relation to the example license plate holder 100 for contextual illustration to show an example integration of a license plate 160 with a license plate holder 100 in accord with at least some aspects of the present concepts.

The example transmissive substrate 120 may include, for instance, but is not limited to, a substrate of glass, treated or strengthened glass (e.g., Gorilla Glass (Corning), Dragontrail (AGC Inc.), Xensation (Schott AG)), Plexiglass (e.g., Lucite, Acrylite, Perspex, Oroglass Optix, Altuglass, etc.), polycarbonate, acrylic (e.g., injection molded acrylic or polymethyl methacrylate, polystyrene or poly(methyl methacrylate)(PMMA). In some examples, the example transmissive substrate 120 is a uniform substrate of a selected material. In some examples, the example transmissive substrate 120 includes a plurality of different regions such as an example first region 126 (e.g., a central region) having a first set of characteristics (e.g., optical properties such as refractive index, transmission/transmittance, absorption, mechanical properties such as Young's modulus, surface finish, strength, hardness, impact resistance, chemical resistance, etc.), an example second region 122 (e.g., a peripheral region) having a second set of characteristics, and an example third region 128 having a third set of characteristics. In some examples, two regions may have the same characteristics (e.g., the example first region 126 and the example third region 128). In the example transmissive substrate 120 shown in FIG. 1, the example first region 126 generally corresponds in size to a display area (e.g., a DIN 1451 license plate number) of an example license plate (e.g., example license plate 160) to be incorporated into the example license plate holder 100 (e.g., a United States license plate, a European license plate, a Chinese license plate, etc.). For instance, in some examples, the example first region 126 is less than 12.0"×6.0" (305 mm×152 mm) for a United States license plate, less than 20.5"×4.3" (520 mm×110 mm) for a license plate of some European countries, or 17.3"×5.5" (440 mm×140 mm) for a Chinese license plate. In some examples, the example first region 126 is a cutout in the example transmissive substrate 120.

In some examples, the third example third region 128 is optionally omitted. In some examples, the example transmissive substrate 120 includes the third example third region 128, as may be required in jurisdictions requiring the display of an additional emblem or sticker (e.g., a governmental vehicle registration sticker, etc.). The example third region 128 may alternatively be sized differently (e.g., larger, smaller, etc.) and/or disposed in another location on the example transmissive substrate 120 to comport with sizing and/or location requirements of any particular jurisdiction. For instance, the example third region 128 may be disposed in a location other than shown in the example of FIG. 1, such as in an upper left portion of the example transmissive substrate 120 or in an upper center portion of the example transmissive substrate 120. In some examples, the example third region 128 is a cutout in the example transmissive substrate 120. In some examples, two example third regions 128 may be provided, such as to permit the display of two emblems or stickers.

The example frame 140 defines an example central opening 142 to permit display of indicia, such as the license plate number, on an example first license plate display region 162. In some examples, such as is shown in FIG. 1, the example central opening 142 opens into, or is contiguous to, an example secondary opening 143 adjacent the example central opening 142. In some examples, the example central opening 142 is a distinct opening separate from that of the example secondary opening 143. As noted above, in some examples, the third example third region 128 is optionally omitted where there are no jurisdictional requirements for the display of an additional emblem or sticker (e.g., a governmental vehicle registration sticker, etc.), at an example second license plate display region 164, in an offset position from the example first license plate display region 162. In such examples, the secondary opening 143 may likewise be omitted. In other examples, the example secondary opening 143 may alternatively be sized differently (e.g., larger, smaller, etc.) and/or disposed in another location on the example frame 140 to comport with sizing and/or location requirements of any particular jurisdiction. For instance, the example secondary opening 143 may be disposed in a location other than shown in the example of FIG. 1, such as in an upper left portion of the example frame 140 or in an upper center portion of the example frame 140.

In some examples, the example central opening 142 is less than about 305 mm×152 mm (12.0"×6.0") and is sized so as not to obscure a first license plate display region 162 (e.g., a license plate number) for a United States vehicle license plate. In some examples, the example central opening 142 is less than about 520 mm×110 mm (20.5"×4.3") and is sized so as not to obscure a first license plate display region 162 (e.g., a license plate number) for a vehicle license plate in some European countries. Likewise, in other examples, the example central opening 142 is less than about 305 mm×152 mm (12.0"×6.0"), 305 mm×160 mm (12.0"×6.3"), 372 mm×135 mm (14.6" 5.3"), 440 mm×120 mm (17.3"×4.7"), 300 mm×80 mm (11.8"×3.1"), or 440 mm×140 mm (17.3"×5.5").

The example frame 140 further defines one or more example frame display regions 146 adjacent the example central opening 142. In the example of FIG. 1, the example frame 140 is shown to define a plurality of frame display regions 146, more particularly, four example frame display regions 146. The example frame 140 of FIG. 1 includes an example bottom frame display region 146 below an example bottom edge of the central opening 142, an example first lateral frame display region 146 adjacent an example first lateral edge of central opening 142, an example second lateral frame display region 146 adjacent an example second lateral edge of central opening 142, or an example upper frame display region 146 above an example top edge of the central opening 142. The one or more example frame display regions 146 include text and/or graphics, which are generically represented in FIG. 1 by fields or arrays of "X" indicia. In some examples, one or more of the example frame display region(s) 146 include(s) user-selectable text or graphics (e.g., selected from a list of options provided on a website, custom printed, etc.), such as may be associated with sports team logos, organizations, colleges or universities, companies, phrases, causes, etc.).

The example frame 140 of FIG. 1 defines a plurality of contiguous walls including an example first wall 141, an example second wall 145, an example third wall 148 and an example fourth wall 149. The example walls 141, 145, 148, 149 extend forwardly to define a first volume (not numbered) at the front of the example frame 140 to receive the example transmissive substrate 120. The example walls 141, 145, 148, 149 also extend rearwardly to define a second volume (not numbered) at the rear of the example frame 140 to receive the example license plate 160 and the example base 200. In some examples, the example walls 141, 145, 148, 149 extend both forwardly and rearwardly. In some examples, a first set of walls extends forwardly and a second set of walls extends rearwardly.

While a plurality of example walls 141, 145, 148, 149 are shown in the example frame 140 of FIG. 1, a lesser number of walls could be provided and/or the configuration of the walls altered. For instance, while not a presently preferred example, the example walls 141, 145, 148, 149 could extend rearwardly, but not forwardly. Instead of the example transmissive substrate 120 being received within the first volume defined by the example walls 141, 145, 148, 149, the example transmissive substrate 120 could instead positively connect to the example frame 140 via a plurality of male (or female) connectors (e.g., snap fit connectors, etc.) formed on the example transmissive substrate 120 to matingly engage with correspondingly configured and positioned female (or male) connectors formed on the example frame 140. In another example, the example transmissive substrate 120 is connected to the example frame 140 via a plurality of mechanical fasteners (e.g., screws, etc.).

In yet another example, the frame 140 could include a subset of the walls of FIG. 1, such as only wall 149 or only wall 148. In such example, the example transmissive substrate 120 could positively connect to the example frame 140 via a plurality of male (or female) connectors (e.g., snap fit connectors, etc.) formed on the example transmissive substrate 120 to matingly engage with correspondingly configured and positioned female (or male) connectors formed on the example frame 140 or, could positively connect to the example frame 140 via a plurality of mechanical fasteners (e.g., screws, etc.).

The example frame 140 includes one or more front connector(s) to removably attach the example transmissive substrate 120 to the front of the example frame 140. It the example of FIG. 1, the example frame 140 includes four example front connectors 147 disposed adjacent a front of the example frame 140. The four example front connectors 147 are cantilevered snap-fit connectors, having a head that is chamfered or tapered at a top surface, to facilitate biasing of the heads away from the first volume upon movement of the example transmissive substrate 120 into the first volume, wherein lateral edges of the example transmissive substrate 120 contact the chamfered or tapered top surfaces of the heads of the example front connectors 147 and slightly bias the heads outwardly. Following passage of the example transmissive substrate 120 into the first volume and past a bottom surface of the head, where it no longer outwardly biases the heads of the example front connectors 147, the heads returns to their initial positions and lower surfaces of the heads facilitate retention of the example transmissive substrate 120 within the first volume. For instance, in some examples, the lower surfaces of the heads of the example front connectors 147 are at flat and are at least substantially parallel to the front surface of the example transmissive substrate 120 such that the heads would have to be manually or digitally biased outwardly to facilitate removal of the example transmissive substrate 120. While four example front connectors 147 are shown, a greater number (e.g., five, six, etc.) or a lesser number (e.g., one, two, three) could alternatively be implemented in the example frame 140. Likewise, different forms of example front connectors 147 (e.g., male/female connectors, mechanical connectors, fasteners, etc.) may be implemented to facilitate removable attachment of the example transmissive substrate 120 to the example frame 140.

In some examples, the example frame 140 includes example openings 144. In some examples of the present concepts, the example openings 144 are omitted.

FIG. 1 also shows an example license plate 160, which may be formed from a variety of materials, such as plastic or metal (e.g., aluminum, steel, an alloy, etc.) or, in some instances, from card stock (e.g., a temporary tag). The example license plate 160 includes an example first license plate display region 162 for display of a license plate number and additional relevant information (e.g., a state of issuance, a state motto, etc.) and an example second license plate display region 164 for display of an emblem or a sticker (e.g., a governmental vehicle registration sticker, etc.) that may be required in a given jurisdiction. In some examples, a third license plate display region (not shown) may be required, similar to that of the example second license plate display region 164, in jurisdictions requiring a second emblem or a sticker. The example license plate 160 includes a plurality of example through holes 165 to receive example mechanical fasteners 150 (e.g., screws, etc.) to secure the example license plate 160 to the example base 200 and/or to the vehicle itself which bears the example license plate holder 100.

As discussed further in relation to FIGS. 2-7B below, the example frame 140 includes one or more rear connectors (not shown in FIG. 1) disposed adjacent a rear of the example frame 140 to removably attach the rear of the example frame 140 to the example base 200.

As noted above, the example license plate 160 may include any dimension specified by any jurisdiction including, but not limited to, for example, 305 mm×152 mm (12.0"×6.0"), 520 mm×110 mm (20.5"×4.3"), or 440 mm×140 mm (17.3"×5.5") to name but a few examples.

The example base 200 of FIG. 1 includes an example central section 202, an example first lateral section 203, and an example second lateral section 204. Formed within the example central section 202 are one or more example first connectors 205 (e.g., through holes, bosses, male connectors, female connectors, etc.) for attaching the example base 200 to a vehicle. The example central section 202 is recessed relative to the example first lateral section 203 and the example second lateral section 204 to define a recessed volume within which the example license plate 160 may be received. The recessed volume of the example central section 202 has an area sufficient to receive an example license plate 160 of a jurisdiction of relevance (e.g., greater than about 305 mm×152 mm (12.0"×6.0") in the United States, greater than about 440 mm×140 mm (17.3"×5.5") in China, etc.). In some examples, the example central section 202, the example first lateral section 203, and the example second lateral section 204 are substantially planar and the the example first lateral section 203 and the example second lateral section 204 do not define a recessed volume therebetween.

Figure 3:
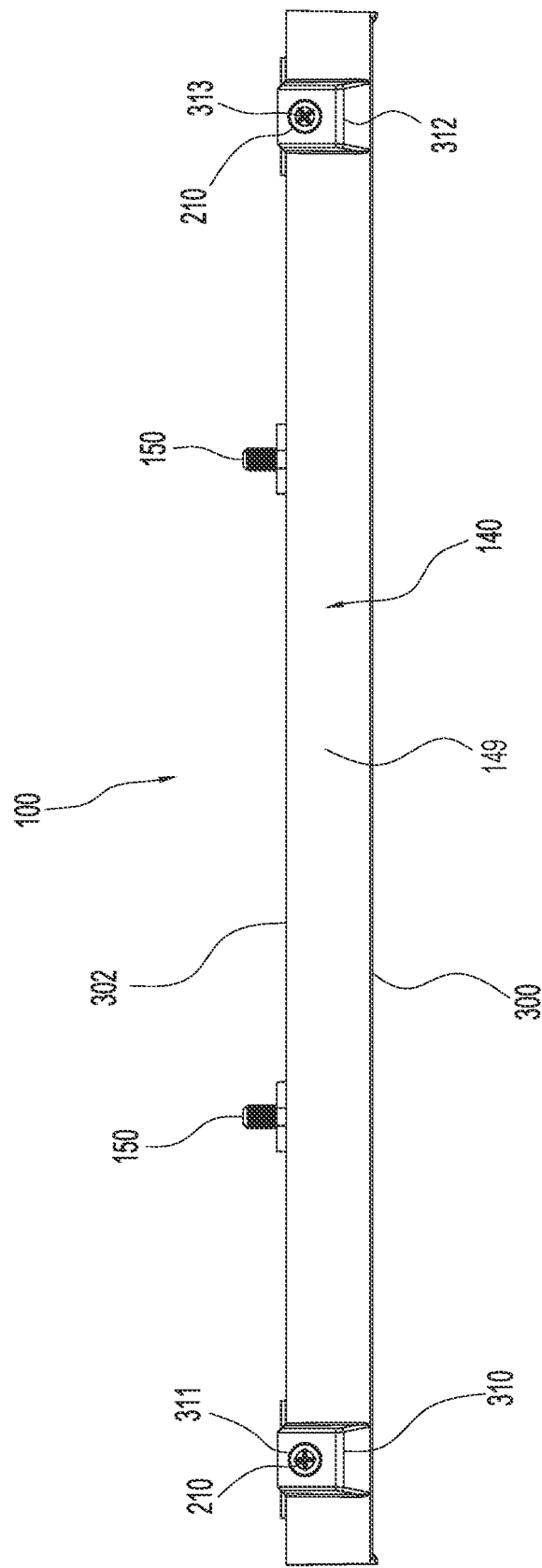
FIG. 3 is an example bottom view of the example license plate holder of FIGS. 1-2B.
Figure 5:
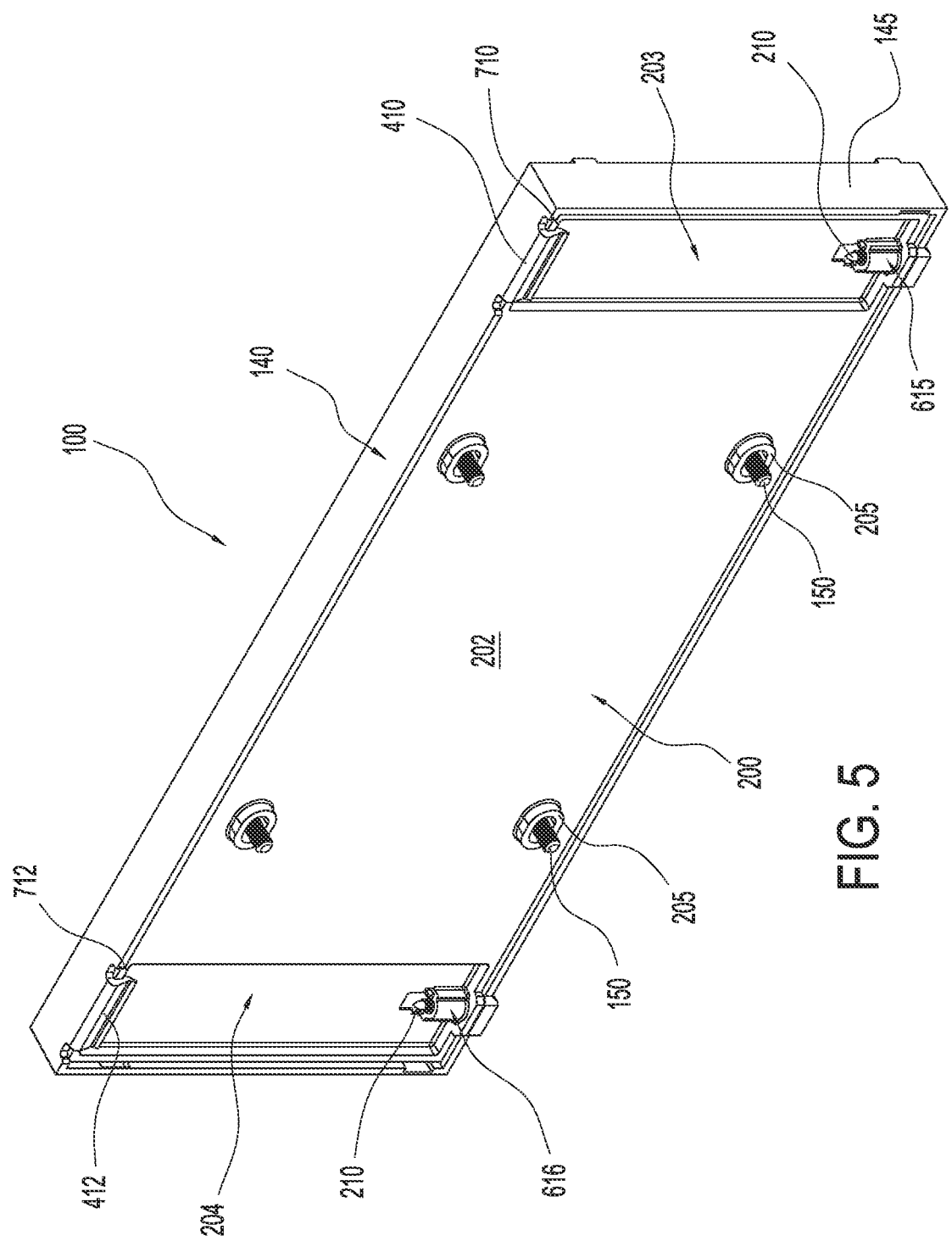
FIG. 5 is an example rear perspective view of the example license plate holder of FIGS. 1-4.
Figure 6:
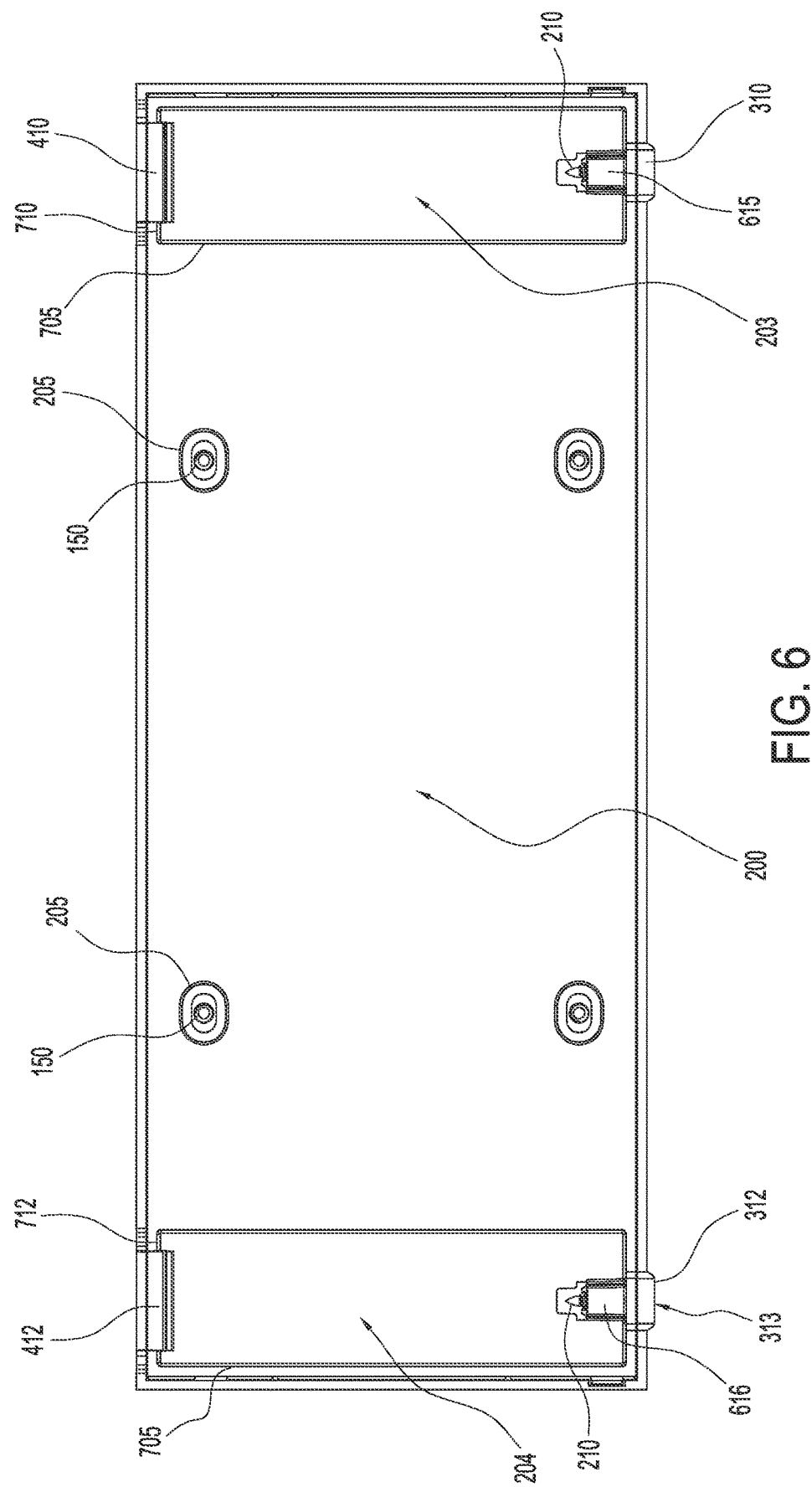
FIG. 6 is an example rear view of the example license plate holder of FIGS. 1-5.

The exploded view of FIG. 1 shows, beneath the example base 200, example rear connectors 210 (e.g., mechanical fasteners, etc.) and example adapters 215 (e.g., anchors, anti-rotation anchors, etc.). The example rear connectors 210, discussed further below in relation to FIGS. 3 and 5-6, are inserted through corresponding openings in the example frame 140 and the example base 200 to secure a lower portion of the example frame 140 to a lower portion of the example base 200. In some examples, the example adapters 215 are inserted only into the example base 200. In some examples, the example adapters 215 are inserted through the example frame 140 and into the example base 200. In some examples, the example adapters 215 are omitted.

Figure 2A:
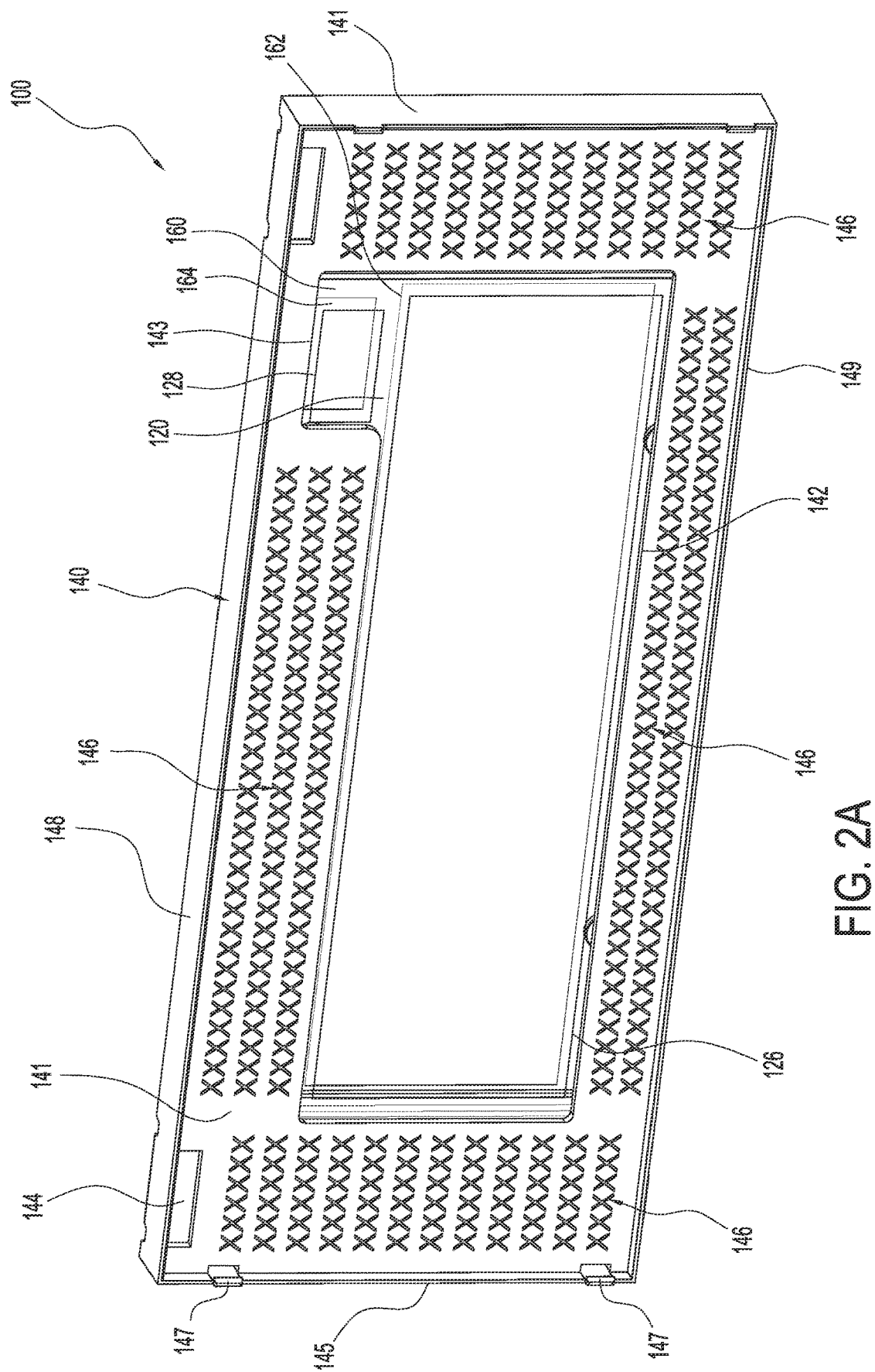
FIG. 2A is a perspective view of the example license plate holder of FIG. 1 in an assembled condition.
Figure 2B:
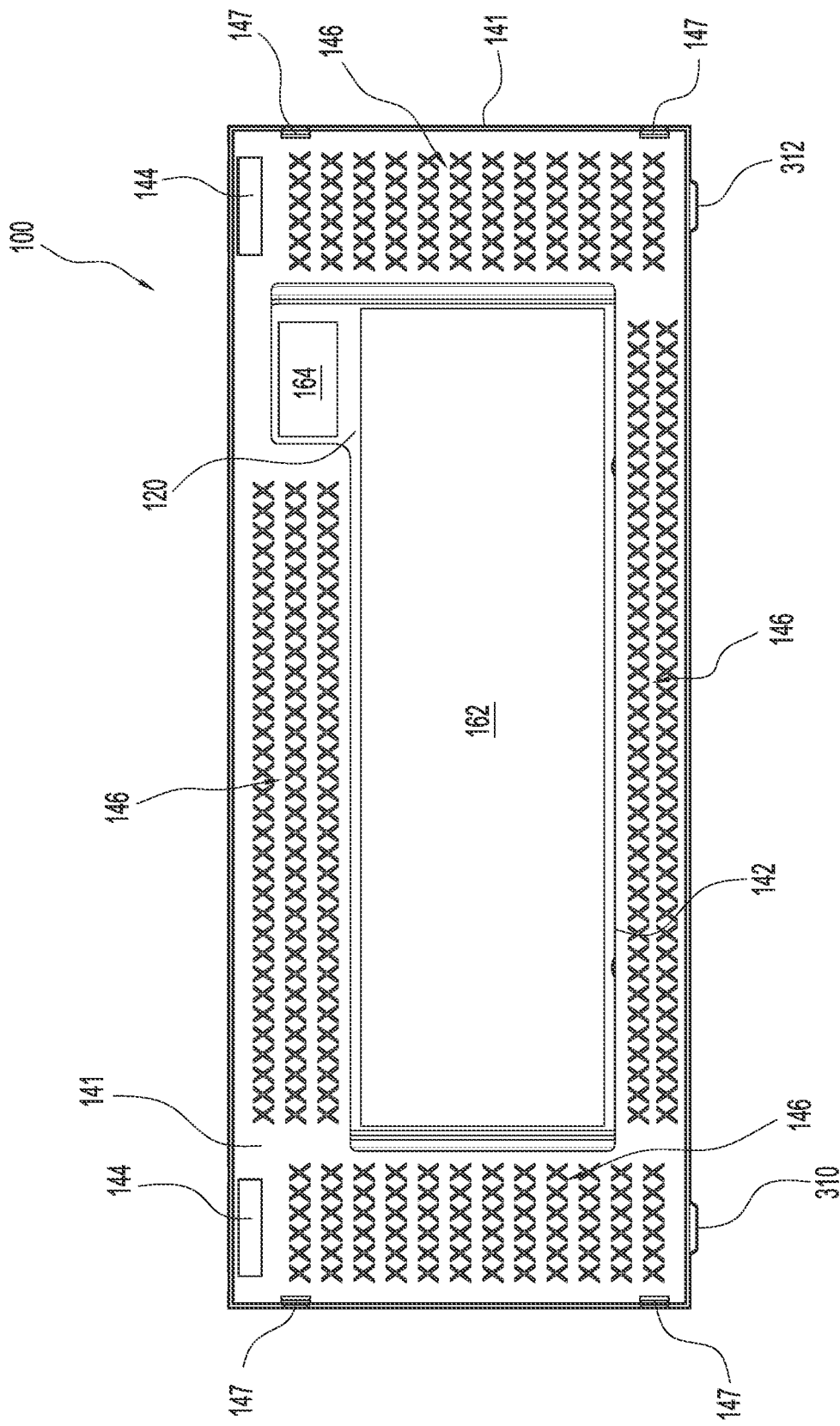
FIG. 2B is a front view of the example license plate holder of FIG. 1 in an assembled condition.

FIG. 2A is a perspective view of the example license plate holder 100 of FIG. 1 in an assembled condition and FIG. 2B is a front view of the example license plate holder 100 of FIG. 1 in an assembled condition. FIGS. 2A-2B show the alignment of the example transmissive substrate 120 within the first volume of the example frame 140 and the alignment of the example frame 140 relative to the example license plate 160 and the example base 200 (not shown in FIGS. 2A-2B). FIGS. 2A-2B show that the example frame display regions 146 are viewable through, and protected by, the example transmissive substrate 120. FIGS. 2A-2B also show that the example first license plate display region 162 is viewable through the example first region 126 of the example transmissive substrate 120 and the example central opening 142 of the example frame 140. Likewise, FIGS. 2A-2B also show that the example second license plate display region 164 is viewable through the example third region 128 of the example transmissive substrate 120 and the example secondary opening 143 of the example frame 140.

FIG. 3 is an example bottom view of the assembled example license plate holder 100 of FIGS. 2A-2B, with the example front 300 of the example frame 140 and the example rear 302 of the example frame 140 being shown. FIG. 3 shows an example first boss 310 formed on a first side of the example wall 149 or bottom portion of the example frame 140 and an example second boss 312 formed on a second side of the example wall 149 of the example frame 140. FIG. 3 also shows an example first boss 310 formed on a first side of the example wall 149 or bottom portion of the example frame 140 and an example second boss 312 formed on a second side of the example wall 149 of the example frame 140. The example first boss 310 aligns with (e.g., is at least substantially coaxial with) an example third boss 615 (not shown in FIG. 3) formed on a first side of an example bottom portion 249 of the example base 200. The example second boss 312 aligns with (e.g., is at least substantially coaxial with) an example fourth boss 616 (not shown in FIG. 3) formed on a second side of an example bottom portion 249 of the example base 200. Each of the example first boss 310 and the example second boss 312 include an example through hole 311 to facilitate receipt of the example mechanical fastener 250, which connects the example first boss 310 and the example second boss 312 of the example frame 140 with, respectively, the example third boss 615 and the example fourth boss 616 of the example base 200.

Figure 4:
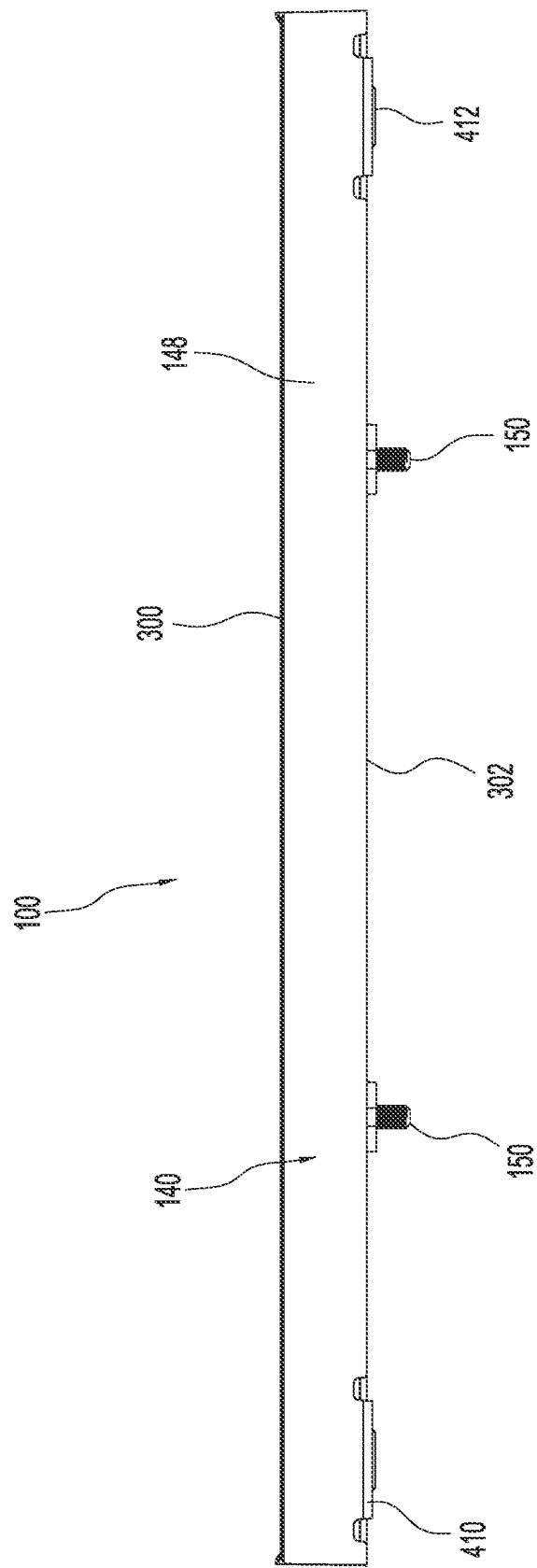
FIG. 4 is an example top view of the example license plate holder of FIGS. 1-3.

FIG. 4 is an example top view of the assembled example license plate holder 100 of FIGS. 2A-3. FIG. 4 shows a top view of an example first upper rear connector 410 and an example second upper rear connector 412, which are shown more fully in FIGS. 5-6.

FIG. 5 is an example rear perspective view of the example license plate holder 100 of FIGS. 1-4 in the assembled condition and FIG. 6 is an example rear view of the example license plate holder of FIGS. 1-5. At the upper end of the assembled example license plate holder 100, FIGS. 5-6 show the example first upper rear connector 410 engaging the example ledge 710 of the example first lateral section 203 of the example base 200. FIGS. 5-6 also show the example second upper rear connector 412 engaging the example ledge 712 of the example second lateral section 204 of the example base 200. In some examples, the example ledges 710, 712 correspond to an upper portion of a recess formed in a rear portion of the example first lateral section 203 and example second lateral portion 204, respectively. In other examples, the rear surface of the example base 200 may be substantially planer and the example ledges 710, 712 may be formed to extend rearwardly therefrom.

Even in isolation (i.e., without the example rear connectors 210), the example first upper rear connector 410 and the example second upper rear connector 412 provide positive engagement with, and lockup of, the example frame 140 and the example base 200.

In FIGS. 5-6, the example mechanical fasteners 150 (e.g., screws, etc.) are shown to protrude through the example first connectors 205 (e.g., through holes, bosses, male connectors, female connectors, etc.) of the example base 200 and, in an installed condition, would connect the example license plate holder 100 to a vehicle.

The right example rear connector 210, in the view of FIGS. 5-6, comprises a mechanical fastener (e.g., a screw, etc.) inserted through the example through hole 311 of the example first boss 310 of the example frame 140 and through a corresponding one of the example adapters 215, which is in turn through or received by the example third boss 615 of the example base 200. The left example rear connector 210, in the view of FIGS. 5-6, comprises a mechanical fastener (e.g., a screw, etc.) inserted through the example through hole 313 of the example second boss 312 of the example frame 140 and through a corresponding one of the example adapters 215, which is itself inserted into or received by the example fourth boss 616 of the example base 200.

While the view of FIGS. 5-6 shows the example first lateral section 203 and the example second lateral section 204 of the example base 200 to define recesses on the rear of the example base 200, in other examples the example first lateral section 203 and the example second lateral section 204 are solid and the example third boss 615, the example fourth boss 616, and the example adapters 215 are omitted in favor of holes (e.g., threaded holes, etc.) to receive the example rear connectors 210. In some examples, rather than two example rear connectors 210 disposed at or near a first and a second lateral end of the example frame 140 and the example base 200, a single centrally disposed rear connector 210 is used to secure a lower portion of the example frame 140 to a lower portion of the example base 200.

FIGS. 7A-7B are, respectively, example right side and left side views of the example license plate holder 100 of FIGS. 1-6, showing alternate views of components of the example frame 140 including the example first upper rear connector 410, the example second upper rear connector 412, the example first boss 310 and the example second boss 312.

Although certain example apparatus, articles of manufacture and methods have been disclosed herein, the scope of coverage of this patent is not limited thereto. To the contrary, this patent covers all methods, apparatus and articles of manufacture fairly falling within the scope of the claims of this patent.

What is claimed is:

1. A license plate holder, comprising:
   a base including a first connector for attaching the base to a vehicle;
   a transmissive substrate; and
   a frame defining a central opening to permit display of indicia on at least one license plate display region of a license plate disposed between the base and the frame and further defining at least one frame display region adjacent the central opening, the frame including at least one rear connector comprising a snap-fit connector to matingly engage an adjacent portion of the base to secure the frame to the base,
   wherein the transmissive substrate, the frame, or both the transmissive substrate and the frame comprises a connector to removably attach the transmissive substrate to the frame with the transmissive substrate disposed at a front of the frame over the at least one frame display region, and
   wherein, in an assembled state with the transmissive substrate disposed at the front of the frame, a central region of the transmissive substrate is positioned over the at least one license plate display region of the frame and a peripheral region of the transmissive substrate is positioned over the at least one frame display region of the frame to cover the at least one frame display region defined on the frame.

2. The license plate holder of claim 1, wherein the at least one rear connector comprises a snap-fit connector disposed along an upper portion of the frame configured to matingly engage a corresponding feature at an upper portion of the base.

3. The license plate holder of claim 1, wherein the at least one rear connector comprises a snap-fit connector disposed along a lateral portion of the frame configured to matingly engage a corresponding feature at a lateral portion of the base.

4. The license plate holder of claim 1, wherein the at least one rear connector comprises a snap-fit connector disposed along a lower portion of the frame configured to matingly engage a corresponding feature at a lower portion of the base.

5. The license plate holder of claim 1, wherein the at least one rear connector comprises at least one snap-fit connector disposed along an upper portion of the frame configured to matingly engage a corresponding feature at an upper portion of the base, at least one snap-fit connector disposed along a lateral portion of the frame configured to matingly engage a corresponding feature at a lateral portion of the base, or at least one snap-fit connector disposed along a lower portion of the frame configured to matingly engage a corresponding feature at a lower portion of the base.

6. The license plate holder of claim 1, wherein the at least one rear connector comprises at least one snap-fit connector disposed along an upper portion of the frame and at least one snap-fit connector disposed along a lower portion of the frame configured to matingly engage a corresponding feature at a lower portion of the base.

7. The license plate holder of claim 1, wherein the at least one rear connector comprises at least one snap-fit connector disposed along a first lateral portion of the frame configured to matingly engage a corresponding feature at a first lateral portion of the base and at least one snap-fit connector disposed along a second lateral portion of the frame, at a side opposite to the first lateral portion, configured to matingly engage a corresponding feature at a second lateral portion of the base.

8. The license plate holder of claim 1, wherein the first region of the transmissive substrate comprises a cutout.

9. The license plate holder of claim 1, wherein the first region of the transmissive substrate comprises a first characteristic and the second region of the transmissive substrate comprises a second characteristic different than the first characteristic.

10. The license plate holder of claim 9, wherein the first characteristic comprises a first optical property and the second characteristic comprises a second optical property.

11. The license plate holder of claim 9, wherein the first characteristic comprises a first surface finish and the second characteristic comprises a second surface finish.

12. The license plate holder of claim 1,
wherein the at least one frame display region defined by the frame comprises a first frame display region and a second frame display region, and
wherein, in an assembled state with the transmissive substrate connected to the frame, a first region of the transmissive substrate is positioned over the central opening of the frame and a second region of the transmissive substrate is positioned over the first frame display region.

13. The license plate holder of claim 12, wherein the first region of the transmissive substrate comprises a first characteristic and the second region of the transmissive substrate comprises a second characteristic, wherein the first characteristic of first region and the second characteristic of the second region are different from one another.

14. The license plate holder of claim 12, wherein the at least one frame display region includes at least one of text or graphics.

15. The license plate holder of claim 14, wherein the at least one of text or graphics comprises text, graphics, or text and graphics, and wherein the text, graphics, or text and graphics are an integral part of the frame.

16. The license plate holder of claim 14, wherein the at least one of text or graphics comprises text, graphics, or text and graphics, and wherein the text, graphics, or text and graphics are an integral part of the frame.

17. The license plate holder of claim 1, wherein the at least one frame display region is disposed to cover and obscure the first connector attaching the base to a vehicle.

18. The license plate holder of claim 17,
wherein the first connector comprises a plurality of through holes dimensioned to receive mechanical fasteners, and
wherein the at least one frame display region is disposed, in an assembled state with the transmissive substrate connected to the frame, to cover and obscure the plurality of through holes and mechanical fasteners received therein.

19. The license plate holder of claim 1, wherein the transmissive substrate comprises at least one snap-fit connector configured to matingly engage a corresponding feature of the frame to connect the transmissive substrate to the frame.

20. The license plate holder of claim 1,
wherein the transmissive substrate comprises a first opening to receive a mechanical fastener, and
wherein the frame further comprises a second opening to receive the mechanical fastener received with the first opening of the transmissive substrate.

* * * * *